(12) United States Patent
Bao et al.

(10) Patent No.: US 12,154,220 B2
(45) Date of Patent: Nov. 26, 2024

(54) DYNAMIC RENDERING METHOD AND DEVICE BASED ON IMPLICIT LIGHT TRANSFER FUNCTION

(71) Applicant: ZHEJIANG UNIVERSITY, Hangzhou (CN)

(72) Inventors: Hujun Bao, Hangzhou (CN); Yuchi Huo, Hangzhou (CN); Rui Wang, Hangzhou (CN); Chuankun Zheng, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/685,476

(22) PCT Filed: Nov. 9, 2022

(86) PCT No.: PCT/CN2022/130742
§ 371 (c)(1),
(2) Date: Feb. 21, 2024

(87) PCT Pub. No.: WO2024/021363
PCT Pub. Date: Feb. 1, 2024

(65) Prior Publication Data
US 2024/0265627 A1    Aug. 8, 2024

(30) Foreign Application Priority Data

Jul. 27, 2022   (CN) .......................... 202210890607.6

(51) Int. Cl.
*G06T 15/50*    (2011.01)
(52) U.S. Cl.
CPC .................................. *G06T 15/506* (2013.01)
(58) Field of Classification Search
None
See application file for complete search history.

(56) References Cited

U.S. PATENT DOCUMENTS

| 2020/0160593 | A1* | 5/2020 | Gu ............................ G06T 7/90 |
| 2021/0004021 | A1  | 1/2021 | Zhang et al. |
| 2023/0037591 | A1* | 2/2023 | Villegas .................... G06T 7/70 |

FOREIGN PATENT DOCUMENTS

| CN | 105389843 | 3/2016 |
| CN | 112367514 | 2/2021 |

(Continued)

OTHER PUBLICATIONS

Bao, Zhongyun, et al. "Scene Inference for Object Illumination Editing." CoRR (2021). (Year: 2021).*

*Primary Examiner* — Ryan McCulley
(74) *Attorney, Agent, or Firm* — Jiwen Chen; Joywin IP Law PLLC

(57) ABSTRACT

The present invention discloses a dynamic rendering method and device based on implicit light transfer function, comprising the following steps: step 1, inserting an object into an original three-dimensional scene to form a new three-dimensional scene, using a new three-dimensional scene, a camera position, and an observation direction as input samples, and using the difference between the true value of the rendering result of the original three-dimensional scene and the true value of the rendering result of the new three-dimensional scene as a first sample label to form a first class of sample data; supervised learning of a neural network by using the first class of sample data, using a neural network with optimizable parameters as the implicit light transfer function; step 2, taking the new three-dimensional scene, the camera position, and the observation direction as input variables of the implicit light transfer function, obtaining a radiance change field of the new three-dimensional scene through the calculating of the implicit light transfer function, and merging the radiance change field into the rendering result of the original three-dimensional scene to (Continued)

obtain the rendering result of the new three-dimensional scene, suitable for dynamic rendering of various three-dimensional scenes.

8 Claims, 3 Drawing Sheets

(56) References Cited

FOREIGN PATENT DOCUMENTS

| | | |
|---|---|---|
| CN | 112767468 | 5/2021 |
| CN | 113689539 | 11/2021 |

* cited by examiner

DYNAMIC RENDERING METHOD AND DEVICE BASED ON IMPLICIT LIGHT TRANSFER FUNCTION

This is a U.S. national stage application of PCT Application No. PCT/CN2022/130742 under 35 U.S.C. 371, filed Nov. 9, 2022 in Chinese, claiming priority of Chinese Application No. 202210890607.6, filed Jul. 27, 2022, all of which are hereby incorporated by reference.

TECHNICAL FIELD

The present invention belongs to the field of rendering and specifically relates to a dynamic rendering method and device based on implicit light transfer function.

DESCRIPTION OF RELATED ART

Rendering technology has always been one of the most important research topics in computer graphics, which is widely used in fields such as computer-aided design, electronic entertainment, and film and television special effects. Its main goal is to quickly and high-quality visualize virtual scenes based on given descriptions and requirements. According to the different rendering effects, rendering can be divided into realistic rendering techniques and non-photorealistic rendering techniques. The main goal of realistic rendering is to realistically simulate and restore various complex light and shadow effects in the real world in virtual scenes, generating images with high realism non-photorealistic rendering mainly focuses on presenting specific artistic styles of rendering results, such as cartoons, sketches, and oil paintings.

Rendering technology, especially realistic rendering technology requires a large amount of computation to obtain high-quality results. Taking the Monte Carlo path tracing method as an example, the foundation of this method is to simulate the physical behavior of optical propagation in the scene, it requires complex interaction calculations between tens of thousands of rays cast on each pixel and the scene to calculate a converged rendering result, which can take up tens of minutes or even several days to render.

Rendering technology is often applied in the design industry, such as interior furniture design, film scene design, etc. Designers generate lighting effects under the current design scheme through rendering algorithms, and accurate rendering results are more beneficial to obtaining a high-quality design. However, in these application scenes, it is often necessary to perform dynamic transformations on specific objects. Traditional rendering methods require redrawing the transformed scene to obtain a new rendering result. However, due to the long time required for realistic rendering, users have to choose between quality and speed, either to quickly obtain low-quality rendering results or to wait for a long time. Considering that in this case, all other objects comprising the camera remain unchanged except for the target object, a large amount of redundant calculations are performed for redrawing. If there is a method to avoid these redundant calculations, a high-quality rendering result can be quickly obtained, greatly improving design efficiency.

The transformation of objects in the scene can cause changes in the light transfer process in the scene, which in turn leads to changes in the rendering result. These changes are very complex and difficult to perform explicit calculations by using traditional algorithms. Neural networks can implicitly learn such changes from a large amount of data. Meanwhile, the rapid development of specialized hardware for neural networks in recent years, such as Tensor Processing Unit (TPU) and Neural Processing Unit (NPU), has greatly improved the computational speed of neural networks. However, existing neural network-based rendering methods all use neural networks to directly predict the rendering result of the entire scene, making it difficult to reuse existing results and collaborate with other rendering methods, these issues limit their flexibility and universality. At present, there is still a lack of a fast dynamic rendering technology that uses neural network chips and is easy to collaborate with other rendering methods or can reuse rendering results.

SUMMARY OF THE INVENTION

Given the above, the object of the present invention is to provide a dynamic rendering method and device based on implicit light transfer function, construct a radiance change field through an implicit light transfer function, and achieve dynamic rendering of various three-dimensional scenes through the combination of the radiance change field and the rendering result.

To achieve the above invention, the embodiment provides a dynamic rendering method based on implicit light transfer function, comprising the following steps:

step 1, constructing an implicit light transfer function, comprising: inserting an object into an original three-dimensional scene to form a new three-dimensional scene, using a new three-dimensional scene, a camera position, and an observation direction as input samples, and using the difference between the true value of the rendering result of the original three-dimensional scene and the true value of the rendering result of the new three-dimensional scene as a first sample label to form a first class of sample data; supervised learning of a neural network by using the first class of sample data, using a neural network with optimizable parameters as the implicit light transfer function;

step 2, using the implicit light transfer function for dynamic rendering, comprising: taking the new three-dimensional scene, the camera position, and the observation direction as input variables of the implicit light transfer function, obtaining a radiance change field of the new three-dimensional scene through the calculating of the implicit light transfer function, and merging the radiance change field into the rendering result of the original three-dimensional scene to obtain the rendering result of the new three-dimensional scene.

In one embodiment, when using the first class of sample data for supervised learning of the neural network, the difference between the predicted output of the neural network on the input samples and the first sample label is used as a loss function, and the parameters of the neural network are optimized by using the loss function;

when using the implicit light transfer function for dynamic rendering, the obtained radiance change field is added to the rendering result of the original three-dimensional scene to obtain the rendering result of the new three-dimensional scene.

In one embodiment, constructing the implicit light transfer function, comprising: building a second sample label $\hat{T}_m(o, \omega; \mathcal{S})$ by:

$$\hat{T}_m(o, \omega; \mathcal{S}) = \hat{G}(o, \omega; \mathcal{S} + m) \times M_m(o, \omega) + $$
$$(1 - M_m(o, \omega)) \times (\hat{G}(o, \omega; \mathcal{S} + m) - \hat{G}(o, \omega; \mathcal{S}))$$

among them, $M_m(o, \omega)$ represents a mask image of the object m observed from the camera position o towards the observation direction $\omega$, when the new three-dimensional scene $\mathcal{S}+m$ formed by inserting the object into the original three-dimensional scene $\mathcal{S}$, $\acute{G}(o, \omega; \mathcal{S}+m)$ represents the true value of the rendering result of the new three-dimensional scene $\mathcal{S}+m$, and $\acute{G}(o, \omega; \mathcal{S})$ represents the true value of the rendering result of the original three-dimensional scene $\mathcal{S}$.

Combining the constructed second sample label $\acute{T}_m(o, \omega; \mathcal{S})$ with the input samples containing the new three-dimensional scene $\mathcal{S}$, the camera position o, and the observation direction $\omega$ to form a second class of sample data, supervising and training the neural network by using the second class of sample data, and using the neural network with optimizable parameters as the implicit light transfer function $T_m$.

Using the implicit light transfer function for dynamic rendering, comprising: taking the new three-dimensional scene, the camera position, and the observation direction as input variables of the implicit light transfer function $T_m$, obtaining the radiance change field $T_m(o, \omega; \mathcal{S})$ of the new three-dimensional scene through the calculating of the implicit light transfer function $T_m$, and merging the radiance change field $T_m(o, \omega; \mathcal{S})$ into the rendering result $G(o, \omega; \mathcal{S})$ of the original three-dimensional scene to obtain the rendering result of the new three-dimensional scene $G(o, \omega; \mathcal{S}+m)$:

$$G(o, \omega; \mathcal{S}+m) = T_m(o, \omega; \mathcal{S}) \times M_m(o, \omega) + (1 - M_m(o, \omega)) \times (T_m(o, \omega; \mathcal{S}) + G(o, \omega; \mathcal{S})).$$

In one embodiment, when a direct illumination rendering result is required, constructing the implicit light transfer function, comprising:
constructing a sample label $\acute{D}_m(o, \omega; \mathcal{S})$ of direct illumination, the sample label $\acute{D}_m(o, \omega; \mathcal{S})$ and the input samples containing the new three-dimensional scene $\mathcal{S}$, the camera position o, and the observation direction $\omega$, forming a sample data of direct illumination, supervised learning of the neural network by using the sample data of direct illumination, using the neural network with optimizable parameters as the implicit light transfer function $D_m$ of direct illumination;

$$\acute{D}_m(o, \omega; \mathcal{S}) = \acute{G}_d(o, \omega; \mathcal{S}+m) \times M_m(o, \omega) + (1 - M_m(o, \omega)) \times \frac{\acute{G}_d(o, \omega; \mathcal{S}+m)}{\acute{G}_d(o, \omega; \mathcal{S})}$$

among them, $M_m(o, \omega)$ represents a mask image of the object m observed from the camera position o towards the observation direction $\omega$, when the new three-dimensional scene $\mathcal{S}+m$ formed by inserting the object into the original three-dimensional scene $\mathcal{S}$, $\acute{G}_d(o, \omega; \mathcal{S}+m)$ represents the true value of the direct illumination rendering result of the new three-dimensional scene $\mathcal{S}+m$, and $\acute{G}_d(o, \omega; \mathcal{S})$ represents the true value of the direct illumination rendering result of the original three-dimensional scene $\mathcal{S}$.

Using the implicit light transfer function for dynamic rendering, comprising: taking the new three-dimensional scene, the camera position, and the observation direction as input variables of the implicit light transfer function $D_m$, obtaining the radiance change field $D_m(o, \omega; \mathcal{S})$ of the new three-dimensional scene through the calculating of the implicit light transfer function, and merging the radiance change field $D_m(o, \omega; \mathcal{S})$ into the direct illumination rendering result of the original three-dimensional scene to obtain the direct illumination rendering result of the new three-dimensional scene.

In one embodiment, when an indirect illumination rendering result is required, constructing the implicit light transfer function, comprising:
constructing a sample label $\acute{I}_m(o, \omega; \mathcal{S})$ of indirect illumination, the sample label $\acute{I}_m(o, \omega; \mathcal{S})$ and the input samples containing the new three-dimensional scene $\mathcal{S}$, the camera position o, and the observation direction $\omega$, forming a sample data of indirect illumination, supervised learning of the neural network by using the sample data of indirect illumination, using the neural network with optimizable parameters as the implicit light transfer function $I_m$ of indirect illumination;

$$\acute{I}_m(o, \omega; \mathcal{S}) = \acute{G}_i(o, \omega; \mathcal{S}+m) \times M_m(o, \omega) + (1 - M_m(o, \omega)) \times (\acute{G}_i(o, \omega; \mathcal{S}+m) - \acute{G}_i(o, \omega; \mathcal{S}))$$

among them, $M_m(o, \omega)$ represents a mask image of the object m observed from the camera position o towards the observation direction $\omega$, when the new three-dimensional scene $\mathcal{S}+m$ formed by inserting the object into the original three-dimensional scene $\mathcal{S}$, $\acute{G}_i(o, \omega; \mathcal{S}+m)$ represents the true value of the indirect illumination rendering result of the new three-dimensional scene $\mathcal{S}+m$, and $\acute{G}_i(o, \omega; \mathcal{S})$ represents the true value of the indirect illumination rendering result of the original three-dimensional scene $\mathcal{S}$.

Using the implicit light transfer function for dynamic rendering, comprising: taking the new three-dimensional scene, the camera position, and the observation direction as input variables of the implicit light transfer function $I_m$, obtaining the radiance change field $I_m(o, \omega; \mathcal{S})$ of the new three-dimensional scene through the calculating of the implicit light transfer function, and merging the radiance change field $I_m(o, \omega; \mathcal{S})$ into the indirect illumination rendering result of the original three-dimensional scene to obtain the indirect illumination rendering result of the new three-dimensional scene.

In one embodiment, when a global illumination rendering result is required, the direct illumination rendering result of the new three-dimensional scene is combined with the indirect illumination rendering result to obtain the global illumination rendering result of the new three-dimensional scene.

To achieve the above invention, the embodiment provides a dynamic rendering method device on implicit light transfer function, comprising:
a building module, constructing an implicit light transfer function, comprising: inserting an object into an original three-dimensional scene to form a new three-dimensional scene, using a new three-dimensional scene, a camera position, and an observation direction as input samples, and using the difference between the true value of the rendering result of the original three-dimensional scene and the true value of the rendering result of the new three-dimensional scene as a first sample label to form a first class of sample data;

supervised learning of a neural network by using the first class of sample data, using a neural network with optimizable parameters as the implicit light transfer function;

a dynamic rendering module, using the implicit light transfer function for dynamic rendering, comprising: taking the new three-dimensional scene, the camera position, and the observation direction as input variables of the implicit light transfer function, obtaining a radiance change field of the new three-dimensional scene through the calculating of the implicit light transfer function, and merging the radiance change field into the rendering result of the original three-dimensional scene to obtain the rendering result of the new three-dimensional scene.

To achieve the above invention, the embodiment also provides a dynamic rendering device based on implicit light transfer function, comprising a memory, a processor, and a computer program stored in the memory and can be executed on the processor, when the processor executes the computer program, the following steps are implemented:

step 1, constructing an implicit light transfer function, comprising: inserting an object into an original three-dimensional scene to form a new three-dimensional scene, using a new three-dimensional scene, a camera position, and an observation direction as input samples, and using the difference between the true value of the rendering result of the original three-dimensional scene and the true value of the rendering result of the new three-dimensional scene as a first sample label to form a first class of sample data; supervised learning of a neural network by using the first class of sample data, using a neural network with optimizable parameters as the implicit light transfer function;

step 2, using the implicit light transfer function for dynamic rendering, comprising: taking the new three-dimensional scene, the camera position, and the observation direction as input variables of the implicit light transfer function, obtaining a radiance change field of the new three-dimensional scene through the calculating of the implicit light transfer function, and merging the radiance change field into the rendering result of the original three-dimensional scene to obtain the rendering result of the new three-dimensional scene.

Compared with the prior art, the beneficial effects include at least:

The radiance change field presented by the implicit light transfer function is introduced by constructing the sample label, the process of constructing the implicit light transfer function is achieved through parameter optimization of the neural network. Based on this, the implicit light transfer function is used to calculate the input independent variables (the new three-dimensional scene, the camera position, and the observation direction) into the radiance change field, and merge the radiance change field into the rendering result of the original three-dimensional scene to obtain the rendering result of the new three-dimensional scene, this can achieve dynamic rendering of various three-dimensional scenes and also improve the rendering speed of the dynamic scene.

BRIEF DESCRIPTION OF THE DRAWINGS

To provide a clearer explanation of the embodiments of the present invention or the technical solutions in the prior art, a brief introduction will be given to the accompanying drawings required in the description of the embodiments or prior art. The accompanying drawings in the following description are only some embodiments of the present invention. For ordinary technical personnel in the art, other accompanying drawings can be obtained based on these drawings without any creative effort.

DETAILED DESCRIPTION OF THE INVENTION

To make the purpose, technical solution, and advantages of the present invention clearer, the following is a further detailed explanation of the present invention in conjunction with the accompanying drawings and embodiments. It should be understood that the specific embodiments described here are only used to explain the present invention and do not limit the scope of protection of the present invention.

Figure 1:
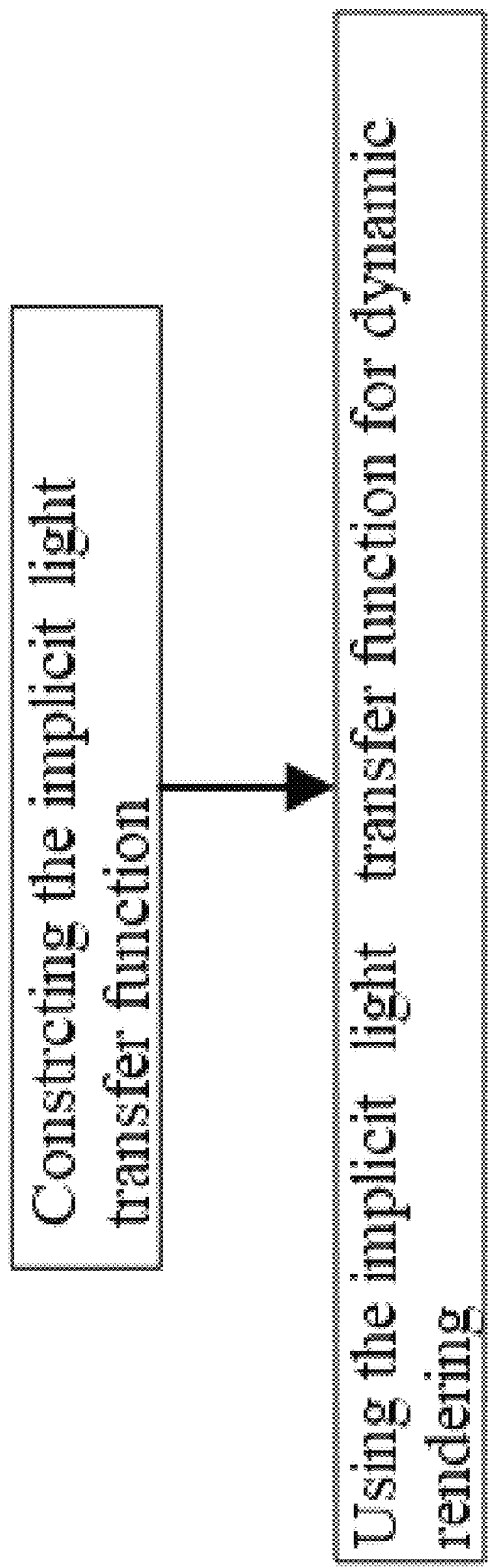
FIG. 1 is a flowchart of a dynamic rendering method based on the implicit light transfer function provided in the embodiment.

FIG. 1 is a flowchart of a dynamic rendering method based on the implicit light transfer function provided in the embodiment. As shown in FIG. 1, the dynamic rendering method based on the implicit light transfer function provided by the embodiment comprises the following steps:

Step 1, constructing an implicit light transfer function.

In one embodiment, constructing the implicit light transfer function, comprising: inserting the object m into an original three-dimensional scene $S$ to form a new three-dimensional scene $S+m$, using the new three-dimensional scene $S+m$, a camera position o, and an observation direction $\omega$ as input samples, and using the difference $Q(o, \omega; S+m)-Q(o, \omega; S))$ between the true value of the rendering result of the original three-dimensional scene $Q(o, \omega; S)$ and the true value of the rendering result of the new three-dimensional scene $Q(o, \omega; S+m)$ as the first sample label to form a first class of sample data; supervised learning of a neural network by using the first class of sample data, using a neural network with optimizable parameters as the implicit light transfer function.

Among them, the original three-dimensional scene contains multiple objects that need to be rendered, as well as rendering light sources. Ray tracing and other methods are used to render and calculate the original three-dimensional scene to obtain the true value of the rendering result of the original three-dimensional scene. Inserting the object into the original three-dimensional scene to form the new three-dimensional scene, similarly, ray tracing and other methods are used to render and calculate the new three-dimensional scene to obtain the true value of the rendering result of the new three-dimensional scene.

The essence of scene rendering is to calculate the transmission of light on the surface of an object, and the color presented on the surface of each object when it is transmitted. Based on this, the difference between the true value of the rendering result of the original three-dimensional scene and the true value of the rendering result of the new three-dimensional scene is used as the radiance change field caused by inserting the object. During training, the difference between the true value of the rendering result of the original three-dimensional scene and the true value of the rendering result of the new three-dimensional scene is directly used as the first sample label for supervised learning of the neural network, enabling the implicit light transfer function of the neural network can be implemented to calculate the light transfer transformation field.

When using the first class of sample data for supervised learning of the neural network, the difference between the predicted output of the neural network on the input samples and the first sample label is used as a loss function, and the parameters of the neural network are optimized by using the loss function.

Step 2, using the implicit light transfer function for dynamic rendering.

In the embodiment, using the implicit light transfer function for dynamic rendering, comprising: taking the new three-dimensional scene $S+m$, the camera position o, and the observation direction ω as input variables of the implicit light transfer function, obtaining a radiance change field of the new three-dimensional scene through the calculating of the implicit light transfer function, and merging the radiance change field into the rendering result of the original three-dimensional scene to obtain the rendering result of the new three-dimensional scene.

In the embodiment, the input variables (o, ω; $S+m$) are input to the neural network, and the implicit light transfer function presented by the neural network is used to perform forward transfer calculation on the input variables to output the radiance change field $P_m$ of the new three-dimensional scene, then the radiance change field $P_m$ is added to the rendering result of the original three-dimensional scene Q(o, ω; $S$) to obtain the rendering result of the new three-dimensional scene Q(o, ω; $S+m$), expressed as Q(o, ω; $S+m$)=$P_m$+Q(o, ω; $S$).

In one embodiment, constructing the implicit light transfer function, comprising: building a second sample label $\acute{T}_m(o, ω; S)$ by:

$$\acute{T}_m(o, ω; S) = \acute{G}(o, ω; S + m) \times M_m(o, ω) + (1 - M_m(o, ω)) \times (\acute{G}(o, ω; S + m) - \acute{G}(o, ω; S))$$

among them, $M_m(o, ω)$ represents a mask image of the object m observed from the camera position o towards the observation direction ω, when the new three-dimensional scene $S+m$ formed by inserting the object into the original three-dimensional scene $S$, $\acute{G}(o, ω; S+m)$ represents the true value of the rendering result of the new three-dimensional scene $S+m$, and $\acute{G}(o, ω; S)$ represents the true value of the rendering result of the original three-dimensional scene $S$.

Combining the constructed second sample label $\acute{T}_m(o, ω; S)$ with the input samples containing the new three-dimensional scene $S$, the camera position o, and the observation direction ω to form a second class of sample data, supervising and training the neural network by using the second class of sample data, and using the neural network with optimizable parameters as the implicit light transfer function $T_m$.

Using the implicit light transfer function for dynamic rendering, comprising: taking (o, ω; $S+m$) as input variables of the implicit light transfer function $T_m$, obtaining the radiance change field $T_m(o, ω; S)$ of the new three-dimensional scene through the calculating of the implicit light transfer function $T_m$, and merging the radiance change field $T_m(o, ω; S)$ into the rendering result G(o, ω; $S$) of the original three-dimensional scene to obtain the rendering result of the new three-dimensional scene G(o, ω; $S+m$):

$$G(o, ω; S + m) = T_m(o, ω; S) \times M_m(o, ω) + (1 - M_m(o, ω)) \times (T_m(o, ω; S) + G(o, ω; S))$$

In the embodiment, to improve the convenience and accuracy of calculating the radiance change field of the inserted object in the future, the mask image $M_m(o, ω)$ of the observable object under the target perspective needs to be pre-generated. Calculating the mask image corresponding to each object group observed from the target perspective based on the object position and camera position.

In one embodiment, when a direct illumination rendering result is required, constructing the implicit light transfer function, comprising:

constructing a sample label $\acute{D}_m(o, ω; S)$ of direct illumination, the sample label $\acute{D}_m(o, ω; S)$ and the input samples containing the new three-dimensional scene $S$, the camera position o, and the observation direction ω, forming a sample data of direct illumination, supervised learning of the neural network by using the sample data of direct illumination, using the neural network with optimizable parameters as the implicit light transfer function $D_m$ of direct illumination;

$$\acute{D}_m(o, ω; S) = \acute{G}_d(o, ω; S + m) \times M_m(o, ω) + (1 - M_m(o, ω)) \times \frac{\acute{G}_d(o, ω; S + m)}{\acute{G}_d(o, ω; S)}$$

among them, $M_m(o, ω)$ represents a mask image of the object m observed from the camera position o towards the observation direction ω, when the new three-dimensional scene $S+m$ formed by inserting the object into the original three-dimensional scene $S$, $\acute{G}_d(o, ω; S+m)$ represents the true value of the direct illumination rendering result of the new three-dimensional scene $S+m$, and $\acute{G}_d(o, ω; S)$ represents the true value of the direct illumination rendering result of the original three-dimensional scene $S$.

Using the implicit light transfer function for dynamic rendering, comprising: taking (o, ω; $S+m$) as input variables of the implicit light transfer function $D_m$, obtaining the radiance change field $D_m(o, ω; S)$ of the new three-dimensional scene through the calculating of the implicit light transfer function $D_m$, and merging the radiance change field $D_m(o, ω; S)$ into the direct illumination rendering result of the original three-dimensional scene to obtain the direct illumination rendering result $G_d(o, ω; S+m)$ of direct illumination of the new three-dimensional scene, which can be expressed as:

$$G_d(o, ω; S + m, \mathcal{L}) = (1 - M_m(o, ω)) \times D_m(o, ω; S, \mathcal{L}) \times G_d(o, ω; S, \mathcal{L}) + M_m(o, ω) \times D_m(o, ω; S, \mathcal{L})$$

In one embodiment, when an indirect illumination rendering result is required, constructing the implicit light transfer function, comprising:

constructing a sample label $\hat{I}_m(o, \omega; S)$ of indirect illumination, the sample label $\hat{I}_m(o, \omega; S)$ and the input samples containing the new three-dimensional scene $S$, the camera position o, and the observation direction ω, forming a sample data of indirect illumination, supervised learning of the neural network by using the sample data of indirect illumination, using the neural network with optimizable parameters as the implicit light transfer function $I_m$ of indirect illumination;

$$\hat{I}_m(o, \omega; S) = \acute{G}_i(o, \omega; S + m) \times M_m(o, \omega) +$$
$$(1 - M_m(o, \omega)) \times (\acute{G}_i(o, \omega; S + m) - \acute{G}_i(o, \omega; S))$$

among them, $M_m(o, \omega)$ represents a mask image of the object m observed from the camera position o towards the observation direction ω, when the new three-dimensional scene $S+m$ formed by inserting the object into the original three-dimensional scene $S$, $\acute{G}_i(o, \omega; S+m)$ represents the true value of the indirect illumination rendering result of the new three-dimensional scene $S+m$, and $\acute{G}_i(o, \omega; S)$ represents the true value of the indirect illumination rendering result of the original three-dimensional scene $S$.

Using the implicit light transfer function for dynamic rendering, comprising: taking (o, ω; $S+m$) as input variables of the implicit light transfer function $I_m$, obtaining the radiance change field $I_m(o, \omega; S)$ of the new three-dimensional scene through the calculating of the implicit light transfer function $I_m$, and merging the radiance change field $I_m(o, \omega; S)$ into the indirect illumination rendering result $G_i(o, \omega; S)$ of the original three-dimensional scene to obtain the indirect illumination rendering result $G_i(o, \omega; S+m)$ of the new three-dimensional scene, which can be expressed as:

$$G_i(o, \omega; S + m, \mathcal{L}) =$$
$$(1 - M_m(o, \omega)) \times (I_m(o, \omega; S) + G_i(o, \omega; S)) + M_m(o, \omega) \times I_m(o, \omega; S)$$

In another embodiment, when a global illumination rendering result is required, the direct illumination rendering result $G_d(o, \omega; S+m)$ of the new three-dimensional scene is combined with the indirect illumination rendering result $G_i(o, \omega; S+m)$ to obtain the global illumination rendering result $R(o, \omega; S+m)$ of the new three-dimensional scene, which can be expressed as:

$$R(o, \omega; S + m) = G_d(o, \omega; S + m) + G_i(o, \omega; S + m).$$

In the embodiment, all input variables (o, ω; $S+m$) need to undergo encoding operation before being input into the neural network, and the obtained encoding result is input into the neural network as the input independent variables of the implicit light transfer function to calculate the radiance change field.

Figure 2:
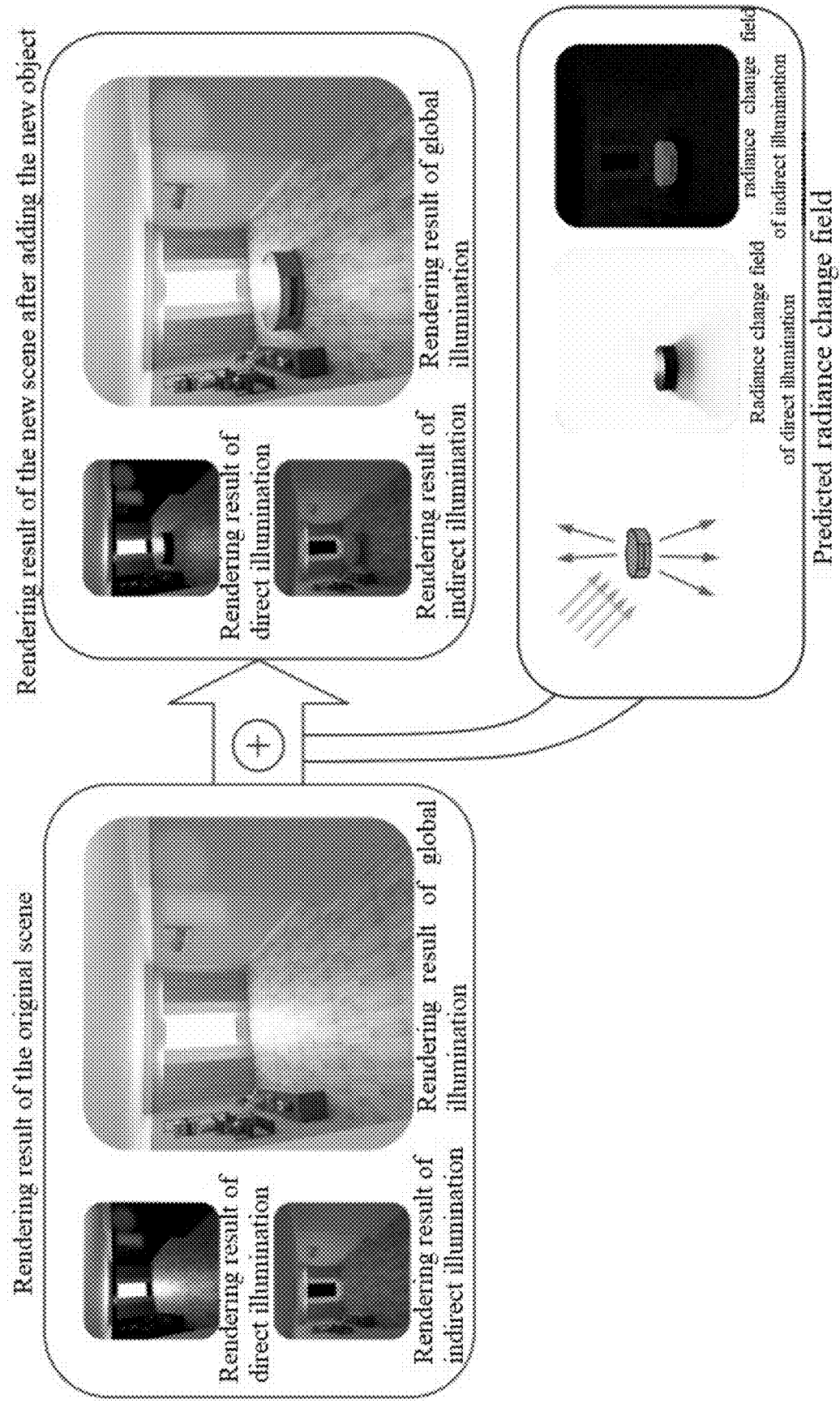
FIG. 2 is a schematic diagram of the rendering process of inserting an object into a three-dimensional scene provided by the embodiment.

The dynamic rendering method based on the implicit light transfer function provided in the above embodiment, introduces the radiance change field presented by the implicit light transfer function by constructing the sample label, the process of constructing the implicit light transfer function is achieved through parameter optimization of neural networks. Based on this, the implicit light transfer function is used to calculate the input independent variables into the radiance change field and merge the light transmission variation field into the rendering result of the original three-dimensional scene to obtain the rendering result of the new three-dimensional scene, as shown in FIG. 2, the process of inserting the object m into the three-dimensional scene and the rendering results before and after insertion can reveal that the rendering quality of the new three-dimensional scene with object m inserted is high.

Figure 3:
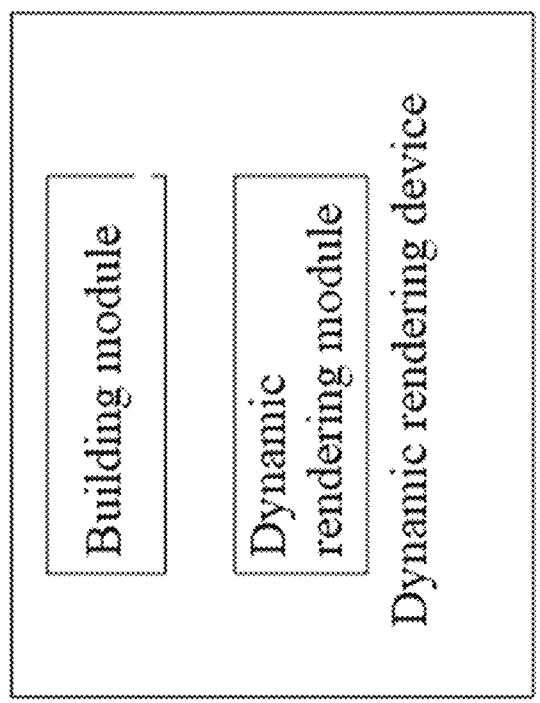
FIG. 3 is a schematic diagram of the structure of a dynamic rendering device based on the implicit light transfer function provided by the embodiment.

FIG. 3 is a schematic diagram of the structure of a dynamic rendering device based on the implicit light transfer function provided by the embodiment. As shown in FIG. 3, the embodiment provides a dynamic rendering method device on implicit light transfer function, comprising:

a building module, constructing an implicit light transfer function, comprising: inserting an object into an original three-dimensional scene to form a new three-dimensional scene, using a new three-dimensional scene, a camera position, and an observation direction as input samples, and using the difference between the true value of the rendering result of the original three-dimensional scene and the true value of the rendering result of the new three-dimensional scene as a first sample label to form a first class of sample data; supervised learning of a neural network by using the first class of sample data, using a neural network with optimizable parameters as the implicit light transfer function;

a dynamic rendering module, using the implicit light transfer function for dynamic rendering, comprising: taking the new three-dimensional scene, the camera position, and the observation direction as input variables of the implicit light transfer function, obtaining a radiance change field of the new three-dimensional scene through the calculating of the implicit light transfer function, and merging the radiance change field into the rendering result of the original three-dimensional scene to obtain the rendering result of the new three-dimensional scene.

It should be noted that the dynamic rendering device based on the implicit light transfer function provided in the above embodiment should be illustrated by the division of each functional module as an example when performing dynamic rendering. The above functions can be allocated to different functional modules according to needs, that is, the internal structure of the terminal or server can be divided into different functional modules to complete all or part of the functions described above. In addition, the dynamic rendering device based on implicit light transfer function provided by the above embodiments and the embodiments of the dynamic rendering method based on the implicit light transfer function belong to the same concept. The specific implementation process is detailed in the embodiments of the dynamic rendering method based on the implicit light transfer function, and will not be repeated here.

The embodiment also provides a dynamic rendering device based on implicit light transfer function, comprising a memory, a processor, and a computer program stored in the memory and can be executed on the processor, when the processor executes the computer program, the following steps are implemented:

step 1, constructing an implicit light transfer function, comprising: inserting an object into an original three-dimensional scene to form a new three-dimensional scene, using a new three-dimensional scene, a camera position, and an observation direction as input samples, and using the difference between the true value of the rendering result of the original three-dimensional scene and the true value of the rendering result of the new three-dimensional scene as a first sample label to form a first class of sample data; supervised learning of a neural network by using the first class of sample data, using a neural network with optimizable parameters as the implicit light transfer function;

step 2, using the implicit light transfer function for dynamic rendering, comprising: taking the new three-dimensional scene, the camera position, and the observation direction as input variables of the implicit light transfer function, obtaining a radiance change field of the new three-dimensional scene through the calculating of the implicit light transfer function, and merging the radiance change field into the rendering result of the original three-dimensional scene to obtain the rendering result of the new three-dimensional scene.

In practical applications, the memory can be volatile memory at the near end, such as RAM, non-volatile memory, such as ROM, FLASH, floppy disk, mechanical hard disk, etc., and can also be a remote storage cloud. The processor can be a central processing unit (CPU), a microprocessor (MPU), a digital signal processor (DSP), a field programmable gate array (FPGA), a graphics processor (GPU), or a neural network processor (NPU), which can be used to implement dynamic rendering methods based on implicit light transfer functions.

The specific embodiments mentioned above provide a detailed explanation of the technical solution and beneficial effects of the present invention. It should be understood that the above are only the optimal embodiments of the present invention and are not intended to limit the present invention. Any modifications, supplements, and equivalent replacements made within the scope of the principles of the present invention should be included in the scope of protection of the present invention.

The invention claimed is:

1. A dynamic rendering method based on implicit light transfer function, comprising the following steps:

step 1, constructing an implicit light transfer function, comprising: inserting an object into an original three-dimensional scene to form a new three-dimensional scene, using a new three-dimensional scene, a camera position, and an observation direction as input samples, and using a difference between a true value of a rendering result of the original three-dimensional scene and a true value of a rendering result of the new three-dimensional scene as a first sample label to form a first class of sample data; supervised learning of a neural network by using the first class of sample data, using a neural network with optimizable parameters as the implicit light transfer function;

step 2, using the implicit light transfer function for dynamic rendering, comprising: taking the new three-dimensional scene, the camera position, and the observation direction as input variables of the implicit light transfer function, obtaining a radiance change field of the new three-dimensional scene through the calculating of the implicit light transfer function, and merging the radiance change field into the rendering result of the original three-dimensional scene to obtain the rendering result of the new three-dimensional scene.

2. The dynamic rendering method based on implicit light transfer function according to claim 1, wherein, when using the first class of sample data for supervised learning of the neural network, the difference between the predicted output of the neural network on the input samples and the first sample label is used as a loss function, and the parameters of the neural network are optimized by using the loss function;

when using the implicit light transfer function for dynamic rendering, the obtained radiance change field is added to the rendering result of the original three-dimensional scene to obtain the rendering result of the new three-dimensional scene.

3. The dynamic rendering method based on implicit light transfer function according to claim 1, wherein, constructing the implicit light transfer function, comprising: building a second sample label $\hat{T}_m(o, \omega; \mathcal{S})$ by:

$$\hat{T}_m(o, \omega; \mathcal{S}) = \hat{G}(o, \omega; \mathcal{S}+m) \times M_m(o, \omega) + $$
$$(1 - M_m(o, \omega)) \times (\hat{G}(o, \omega; \mathcal{S}+m) - \hat{G}(o, \omega; \mathcal{S}))$$

among them, $M_m(o, \omega)$ represents a mask image of the object m observed from the camera position o towards the observation direction $\omega$, when the new three-dimensional scene $\mathcal{S}+m$ formed by inserting the object into the original three-dimensional scene $\mathcal{S}$, $\hat{G}(o, \omega; \mathcal{S}+m)$ represents the true value of the rendering result of the new three-dimensional scene $\mathcal{S}+m$, and $\hat{G}(o, \omega; \mathcal{S})$ represents the true value of the rendering result of the original three-dimensional scene $\mathcal{S}$;

combining the constructed second sample label $\hat{T}_m(o, \omega; \mathcal{S})$ with the input samples containing the new three-dimensional scene $\mathcal{S}$, the camera position o, and the observation direction $\omega$ to form a second class of sample data, supervising and training the neural network by using the second class of sample data, and using the neural network with optimizable parameters as the implicit light transfer function $T_m$;

using the implicit light transfer function for dynamic rendering, comprising: taking the new three-dimensional scene, the camera position, and the observation direction as input variables of the implicit light transfer function $T_m$, obtaining the radiance change field $T_m(o, \omega; \mathcal{S})$ of the new three-dimensional scene through the calculating of the implicit light transfer function $T_m$, and merging the radiance change field $T_m(o, \omega; \mathcal{S})$ into the rendering result of the original three-dimensional scene $G(o, \omega; \mathcal{S})$ to obtain the rendering result of the new three-dimensional scene $G(o, \omega; \mathcal{S}+m)$:

$$G(o, \omega; \mathcal{S}+m) = $$
$$T_m(o, \omega; \mathcal{S}) \times M_m(o, \omega) + (1 - M_m(o, \omega)) \times (T_m(o, \omega; \mathcal{S}) + G(o, \omega; \mathcal{S})).$$

4. The dynamic rendering method based on implicit light transfer function according to claim 1, wherein, when a direct illumination rendering result is required, constructing the implicit light transfer function, comprising:

constructing a sample label $\hat{D}_m(o, \omega; \mathcal{S})$ of direct illumination, the sample label $\hat{D}_m(o, \omega; \mathcal{S})$ and the input samples containing the new three-dimensional scene $\mathcal{S}$, the camera position o, and the observation direction $\omega$, forming a sample data of direct illumination, supervised learning of the neural network by using the sample data of direct illumination, using the neural network with optimizable parameters as the implicit light transfer function $D_m$ of direct illumination;

$$\acute{D}_m(o, \omega; \mathcal{S}) =$$

$$\acute{G}_d(o, \omega; \mathcal{S}+m) \times M_m(o, \omega) + (1 - M_m(o, \omega)) \times \frac{\acute{G}_d(o, \omega; \mathcal{S}+m)}{\acute{G}_d(o, \omega; \mathcal{S})}$$

among them, $M_m(o, \omega)$ represents a mask image of the object m observed from the camera position o towards the observation direction ω, when the new three-dimensional scene $\mathcal{S}+m$ formed by inserting the object into the original three-dimensional scene $\mathcal{S}$, $\acute{G}_d(o, \omega; \mathcal{S}+m)$ represents the true value of the direct illumination rendering result of the new three-dimensional scene $\mathcal{S}+m$, and $\acute{G}_d(o, \omega; \mathcal{S})$ represents the true value of the direct illumination rendering result of the original three-dimensional scene $\mathcal{S}$;

using the implicit light transfer function for dynamic rendering, comprising: taking the new three-dimensional scene, the camera position, and the observation direction as input variables of the implicit light transfer function $D_m$, obtaining the radiance change field $D_m(o, \omega; \mathcal{S})$ of the new three-dimensional scene through the calculating of the implicit light transfer function $D_m$, and merging the radiance change field $D_m(o, \omega; \mathcal{S})$ into the direct illumination rendering result of the original three-dimensional scene to obtain the direct illumination rendering result of the new three-dimensional scene.

5. The dynamic rendering method based on implicit light transfer function according to claim 1, wherein, when an indirect illumination rendering result is required, constructing the implicit light transfer function, comprising:

constructing a sample label $\acute{I}_m(o, \omega; \mathcal{S})$ of indirect illumination, the sample label $\acute{I}_m(o, \omega; \mathcal{S})$ and the input samples containing the new three-dimensional scene $\mathcal{S}$, the camera position o, and the observation direction ω, forming a sample data of indirect illumination, supervised learning of the neural network by using the sample data of indirect illumination, using the neural network with optimizable parameters as the implicit light transfer function $I_m$ of indirect illumination;

$$\acute{I}_m(o, \omega; \mathcal{S}) = \acute{G}_i(o, \omega; \mathcal{S}+m) \times M_m(o, \omega) +$$

$$(1 - M_m(o, \omega)) \times (\acute{G}_i(o, \omega; \mathcal{S}+m) - \acute{G}_i(o, \omega; \mathcal{S}))$$

among them, $M_m(o, \omega)$ represents a mask image of the object m observed from the camera position o towards the observation direction ω, when the new three-dimensional scene $\mathcal{S}+m$ formed by inserting the object into the original three-dimensional scene $\mathcal{S}$, $\acute{G}_i(o, \omega; \mathcal{S}+m)$ represents the true value of the indirect illumination rendering result of the new three-dimensional scene $\mathcal{S}+m$, and $\acute{G}_i(o, \omega; \mathcal{S})$ represents the true value of the indirect illumination rendering result of the original three-dimensional scene $\mathcal{S}$;

using the implicit light transfer function for dynamic rendering, comprising: taking the new three-dimensional scene, the camera position, and the observation direction as input variables of the implicit light transfer function $I_m$, obtaining the radiance change field $I_m(o, \omega; \mathcal{S})$ of the new three-dimensional scene through the calculating of the implicit light transfer function, and merging the radiance change field $I_m(o, \omega; \mathcal{S})$ into the indirect illumination rendering result of the original three-dimensional scene to obtain the indirect illumination rendering result of the new three-dimensional scene.

6. The dynamic rendering method based on implicit light transfer function according to claim 1, wherein, when a global illumination rendering result is required, a direct illumination rendering result of the new three-dimensional scene is combined with an indirect illumination rendering result to obtain the global illumination rendering result of the new three-dimensional scene.

7. A dynamic rendering device on implicit light transfer function, comprising:

a building module for constructing an implicit light transfer function, comprising a first memory, a first processor, and a first computer program stored in the first memory and executable on the first processor, when the first processor executes the first computer program, the following steps are implemented: inserting an object into an original three-dimensional scene to form a new three-dimensional scene, using a new three-dimensional scene, a camera position, and an observation direction as input samples, and using a difference between a true value of a rendering result of the original three-dimensional scene and a true value of a rendering result of the new three-dimensional scene as a first sample label to form a first class of sample data; supervised learning of a neural network by using the first class of sample data, using a neural network with optimizable parameters as the implicit light transfer function;

a dynamic rendering module for using the implicit light transfer function for dynamic rendering, comprising a second memory, a second processor, and a second computer program stored in the second memory and executable on the second processor, when the second processor executes the second computer program, the following steps are implemented: taking the new three-dimensional scene, the camera position, and the observation direction as input variables of the implicit light transfer function, obtaining a radiance change field of the new three-dimensional scene through the calculating of the implicit light transfer function, and merging the radiance change field into the rendering result of the original three-dimensional scene to obtain the rendering result of the new three-dimensional scene.

8. A dynamic rendering device based on implicit light transfer function, comprising a memory, a processor, and a computer program stored in the memory and executable on the processor, when the processor executes the computer program, the following steps are implemented:

step 1, constructing an implicit light transfer function, comprising: inserting an object into an original three-dimensional scene to form a new three-dimensional scene, using a new three-dimensional scene, a camera position, and an observation direction as input samples, and using a difference between a true value of a rendering result of the original three-dimensional scene and a true value of a rendering result of the new three-dimensional scene as a first sample label to form a first class of sample data; supervised learning of a neural network by using the first class of sample data, using a neural network with optimizable parameters as the implicit light transfer function;

step 2, using the implicit light transfer function for dynamic rendering, comprising: taking the new three-dimensional scene, the camera position, and the observation direction as input variables of the implicit light transfer function, obtaining a radiance change field of the new three-dimensional scene through the calculating of the implicit light transfer function, and merging the radiance change field into the rendering result of the original three-dimensional scene to obtain the rendering result of the new three-dimensional scene.

* * * * *